United States Patent [19]

Harada et al.

[11] Patent Number: 4,580,259

[45] Date of Patent: Apr. 1, 1986

[54] SWITCHBOARD CONTROL SYSTEM

[75] Inventors: Hidemi Harada, Kawasaki; Yasushi Nagahama, Yokohama; Yoshiaki Matsuura, Kawasaki; Kenzo Aoki; Atsuhisa Takahashi, both of Kawasaki, all of Japan

[73] Assignee: Futjitsu Limited, Kawasaki, Japan

[21] Appl. No.: 359,677

[22] Filed: Mar. 19, 1982

[51] Int. Cl.$^4$ .................. H04Q 11/04; H04J 3/12; H04M 3/00

[52] U.S. Cl. .................. 370/58; 370/110.1; 179/18 J

[58] Field of Search .................. 370/58, 62, 53, 110.1; 179/18 J, 27 FA, 18 AD, 53, 54

[56] References Cited

U.S. PATENT DOCUMENTS

| | | | |
|---|---|---|---|
| 3,050,589 | 8/1962 | Vaughan | 370/110.1 |
| 3,385,935 | 5/1968 | Anderson et al. | 179/18 AD |
| 3,697,701 | 10/1972 | Greason, III et al. | 179/18 AD |
| 3,752,933 | 10/1973 | Cohen et al. | 370/110.1 |
| 3,821,478 | 6/1974 | Hillman, Jr. et al. | 370/110.1 |
| 3,898,387 | 8/1975 | Fort | 370/110.1 |
| 3,970,799 | 7/1976 | Colton et al. | 370/110.1 |
| 4,081,613 | 3/1978 | Reines et al. | 179/18 J |
| 4,125,745 | 11/1978 | Steidl | 370/110.1 |
| 4,392,222 | 7/1983 | Ando | 370/110.1 |

OTHER PUBLICATIONS

Bell Telephone Record, vol. 43 #1, Dec. 1965, "Telephone Answering Services", R. E. Watson, Jr. et al., pp. 447-450.
IEEE National Telecommun. Conf. Rec.; pp. 39:5-1-39-:5-7, 1977 "DSS-1, A Digital Local Switching System with Remote Line Switches", C. G. Srala.
Commutation and Transmission No. 1, Numero Special Tlecom 1979, pp. 103-112, The MT Digital Time Division Switching Range of Thompson CSF, Perrot.
EP-A-0 018 910 (Cit-Alcatel).
Commutation & Transmission, vol. 2, No. 3, Sep. 1980, Paris (FR) J. Charpentier et al.: "Les Positions d'Operatrice dans le System MT".
WO-A-7 900 316 (Gueldenpfenning et al.).
International Switching Symposium, Session 31A, May 11, 1979 Paris (FR) H. Sueyoshi et al.: "Un Systeme de Commutation Temporelle d'Utilisation Souple Pour Centre Urbain NEAX 61".
National Telecommunications Conference, Conference Record, Nov. 27-29, 1979.
IEE, Washington, D.C. (US) D. Ference: "The Evolution of a Digital Switching System to Include Integrated Operator Services.

Primary Examiner—Douglas W. Olms
Assistant Examiner—Frank M. Scutch, III
Attorney, Agent, or Firm—Staas & Halsey

[57] ABSTRACT

A switchboard control system in which a plurality of switchboards are connected to a time division exchange and controlled by the time division exchange. A speech signal and a control signal (a signal for key information, display information, subscriber number information and other information necessary for the exchange operation by a switchboard operator), which are delivered and received by each switchboard and the time division exchange, are transmitted together by a common transmission line on a time-division-multiplexed basis. On the side of the system toward the switchboards are disposed a position controller, by which the signals are multiplexed and separated and the common transmission line and the switchboards are interconnected. For delivering and receiving the signals, common channel signalling equipment is connected to the time division exchange and remote channel signalling equipment is provided in the position controller. Between the signalling equipment, the control signal is transferred via the common transmission line and, between the remote common channel signalling equipment and each switchboard, it is transmitted via a control signal line comprising a common bus separate from a signal line for the speech signal.

6 Claims, 7 Drawing Figures

SWITCHBOARD CONTROL SYSTEM

BACKGROUND OF THE INVENTION

1. Field of the Invention

The present invention relates to a switchboard control system, and more particularly to a switchboard control system for a time division exchange in which a plurality of switchboards are connected to a time division network.

2. Description of the Prior Art

Generally, in a toll switch and in an international switch, equipment associated with a switchboard is set up as an annex to a time division exchange for calls that are required to be connected by the switchboard operator.

In this kind of switchboard control system, as described, for instance, in "NXR-20 International Telephone Switching System", NEC RESEARCH & DEVELOPMENT, No. 54, July, 1979, p88–105, each switchboard has a voice signal line connected to a network and a control signal line connected to a central controller, and the connection between a trunk, the switchboard and a position trunk connected to in a time or space division network is carried out by controlling the network with the central controller.

This will be described in more detail. When the central controller of a time division exchange, decides that an incoming call from a trunk line needs connection by a switchboard, the central controller sends out incoming indication information to one of a plurality of switchboards that is selected following a predetermined procedure. As soon as the operator of the switchboard answers using an answer key, the central controller detects the operation of the answer key, acquires an idle position trunk (having three terminals F, R and P) and controls the network to connect the terminal F of the position trunk and the trunk connected to the incoming trunk line and to connect the terminal P of the position trunk and the switchboard that the central controller. The operator of the switchboard asks the calling party the classification of the call, the calling party's number, the called party's number and so forth and then operates an input key to enter information necessary for preparing a toll ticket. The central controller, after detecting information input on the operation of the input key, sends the toll ticket information to a display on the switchboard for display. At the same time, the information is stored in a memory. Upon the actuation of a called party select key by the operator of the switchboard, the central controller detects the operation of the called party select key, acquires a trunk connected to an idle trunk line connected to the called subscriber, controls the network to connect the acquired trunk and the terminal R of the position trunk, and performs processing for connection of the called party. The central controller detects an answer from the called party via the trunk and controls a predetermined lamp on the switchboard to indicate the detection. When the operator operates a disconnect key after confirming communication between the calling and the called party, the central controller detects the operation of the disconnect key and controls the network, disconnecting the terminal P of the position trunk from the switchboard.

As will be appreciated from the above description, the prior art switchboard control system has the following disadvantages:

First, each switchboard must be provided with a voice signal line connected to the network and, consequently, the voice signal line and a trunk are needed between each switchboard and the network, making the system configuration uneconomical.

Secondly, a control signal line must be provided between each switchboard and the central controller for transmitting operation information for various keys of the switchboard, display information for various display instruments and information for exchange processing. Since the information to be transmitted includes a large quantity of information such as toll ticket information or directory assistance information, large-capacity information transmitting means is required; in addition, the transmission admits of no delay. If a known common bus transmission system is employed for the control signal line, then its length is limited, imposing undesirable limitations on the distance between the switchboard and the time division exchange.

Third, if a MODEM is introduced into the control signal lin to increase the length between the switchboard and the automatic exchange, then the transmission rate is reduced and, an increase in the number of such MODEMs used to compensate for the reduced transmission rate would be more uneconomical.

SUMMARY OF THE INVENTION

It is an object of the present invention to provide a switchboard control system for a time division exchange having a plurality of switchboards connected to a time division network which permits economical construction of a voice signal line, a control signal line and an associated control unit for each switchboard.

Another object of the present invention is to provide a switchboard control system for a time division exchange having a plurality of switchboards connected to a time division network which economically eliminates limitations on the distance between each switchboard and the time division exchange.

Another object of the present invention is to provide a switchboard control system for a time division exchange having a plurality of switchboards connected to a time division network which permits easy setting of a countermeasure for trouble by duplexing common channel signalling equipment for control signals which are delivered and received between the switchboards and the time division exchange.

Another object of the present invention is to provide a switchboard control system for a time division exchange having a plurality of switchboards connected to a time division network which facilitates decentralization of the load on a processing unit for control signals delivered and received between each switchboard and the time division exchange by dividing the processing unit into two processing units, one on the side of the switchboard and one on the side of the time division exchange.

According to the present invention, a switchboard control system for a time division exchange having plurality of switchboards connected to a time division network, comprises a time division multiplex transmission line common to speech signals and control signals to be transferred between the switchboard and the time division exchange, for transmitting the speech and control signals on a time-division-multiplexed basis.

According to an aspect of the present invention, the switchboard control system is provided with a position controller which multiplexes speech signals and control signals from a plurality of switchboards and provides the multiplexed signals on a common time division multiplex transmission line for transmission to a time division exchange and which separates time-division-multiplexed speech and control signals transmitted from the time division switch via the common time division multiplex transmission line and applies the individually separated signals to the plurality of switchboards.

According to another aspect of the present invention, the control signal is transmitted from common channel signalling equipment of the time division exchange to remote common channel signalling equipment of the position controller via a path including the common time division multiplex transmission line, and the control signal is transmitted from the remote common channel signalling equipment to each switchboard via a control signal line provided separately from a speech signal line.

DESCRIPTION OF THE PREFERRED EMBODIMENTS

Figure 1:
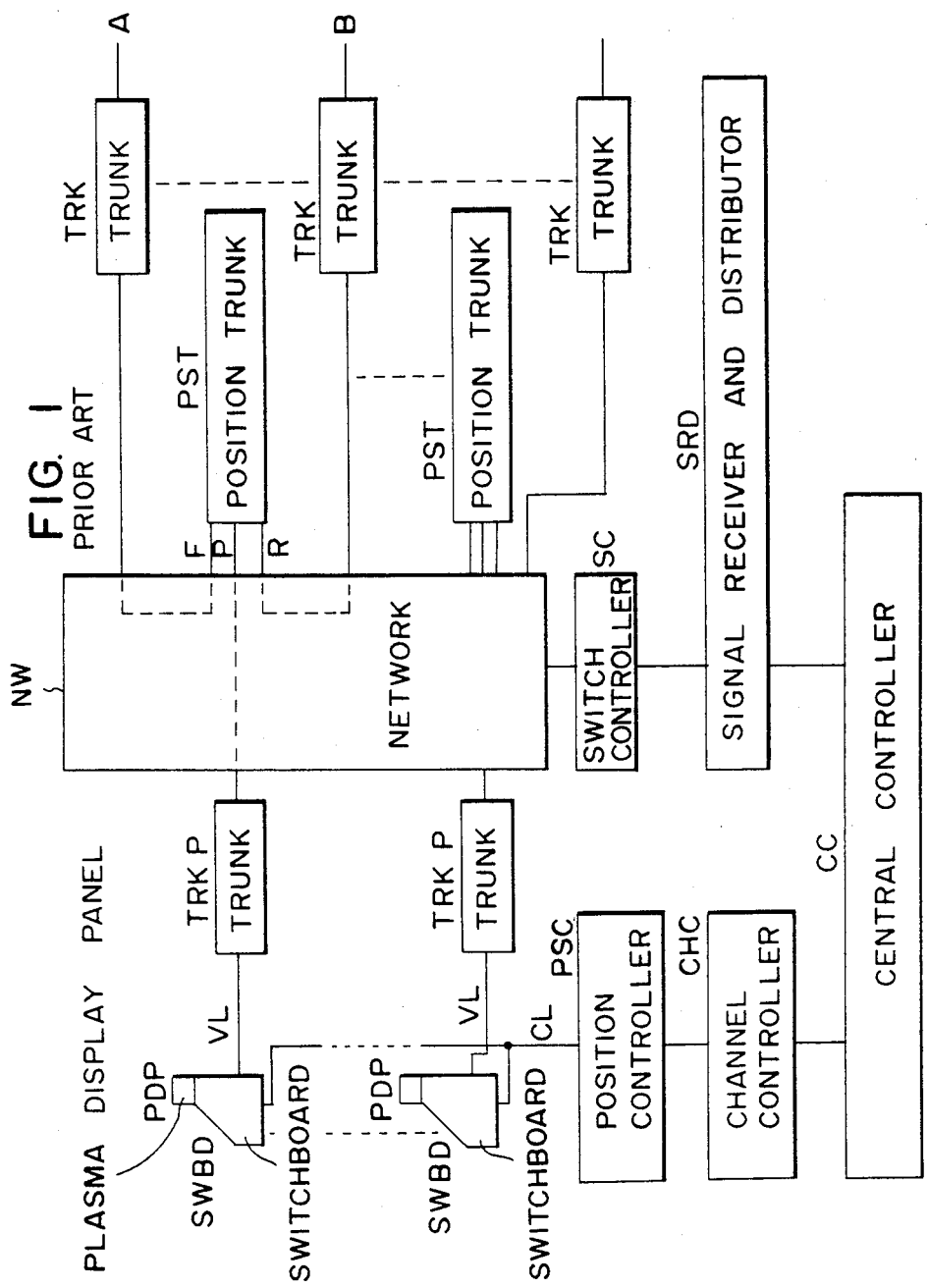
FIG. 1 is a connection diagram showing an example of a conventional switchboard control system.

FIG. 1 illustrates, by way of example, the arrangement of a prior art switchboard control system for a time division exchange in which switchboard-related equipment is set up as an annex thereto.

In FIG. 1, pluralities of trunks TRK, switchboards SWBD and position trunks PST are connected to in a time division or space division network NW. Now, let it be assumed that a central controller CC of the time division exchange has decided that an incoming call from a trunk line A needs connection by a switchboard. The central controller CC sends out incoming indicator information to a selected one of the plurality of switchboards SWBD via a channel controller CHC, a position controller PSC provided in common to the switchboards SWBD and a control signal line CL. As soon as the operator of the selected switchboard SWBD answers by operating an answer key, the central controller CC detects the operation of the answer key via the control signal line CL, the position controller PSC and the channel controller CHC. Then the central controller CC seizes an idle position trunk PST (having three terminals F, P and R) and controls the network NW to connect the terminal F of the seized position trunk PST with the trunk TRK connected to the trunk line A and the terminal P of the position trunk PST with a trunk TRKP of a voice signal line VL of the switchboard SWBD having answered. The operator of the switchboard SWBD inquires of the calling subscriber about the classification of the call; the calling subscriber's number, the called subscriber's number and so forth, and then operates input keys to enter information necessary for preparing a toll ticket. The central controller CC detects the operation of the input keys via the control signal line CL, the position controller PSC and the channel controller CHC, and sends the toll ticket information via the channel controller CHC, the position controller PSC and the control signal line CL to a plasma display panel (PDP) on the switchboard SWBD for display. At the same time, the toll ticket information is stored in a memory (not shown). Upon actuation of a called party select key by the operator of the switchboard SWBD, the central controller CC detects it via the control signal line CL, the position controller PSC and the channel controller CHC. Then the central controller CC seizes a trunk TRK connected to an idle trunk line B connected to the called party, controls the network NW to connect the seized trunk TRK to the terminal R of the position trunk PST, and performs processing for connection of the called party. Upon detection of an answer by the called party via the trunk TRK, the central controller CC controls a predetermined lamp on the switchboard SWBD via the channel controller CHC, the position controller PSC and the control signal line CL, indicating that the called party has answered. When the operator actuates a disconnect key after confirming communication between the calling and the called subscribers, the central controller CC detects the operation of the disconnect key via the control signal line CL, the position controller PSC and the channel controller CHC, and it controls the network NW to disconnect the terminal P of the position trunk PST from the trunk TRK P of the voice signal line VL leading to the switchboard SWBD.

As is evident from the above description, the conventional switchboard control system has such shortcomings as follows: First, it is necessary that each switchboard be provided with the voice signal line VL and the trunk TRK P with respect to the network NW, resulting in the system configuration becoming uneconomical. Second, the control signal line CL and the position controller PSC must be provided for transmitting a control signal between each switchboard SWBD and the central controller CC. In this case, however, since the control signal data to be transmitted is large in quantity and should not be delayed, the control signal line CL is required to transmit a large quantity of information at high speed. If the control signal line were constructed using a known common bus system, it would be limited in length, imposing undesirable limitations on the distance between the switchboard and the automatic exchange. Third, if special transmitting means, for instance, a known MODEM or the like, were introduced to increase the distance between the switchboard and the automatic exchange, the manufacturing costs would be further increased. The present invention offers a solution to such problems encountered in the past.

Figure 2:
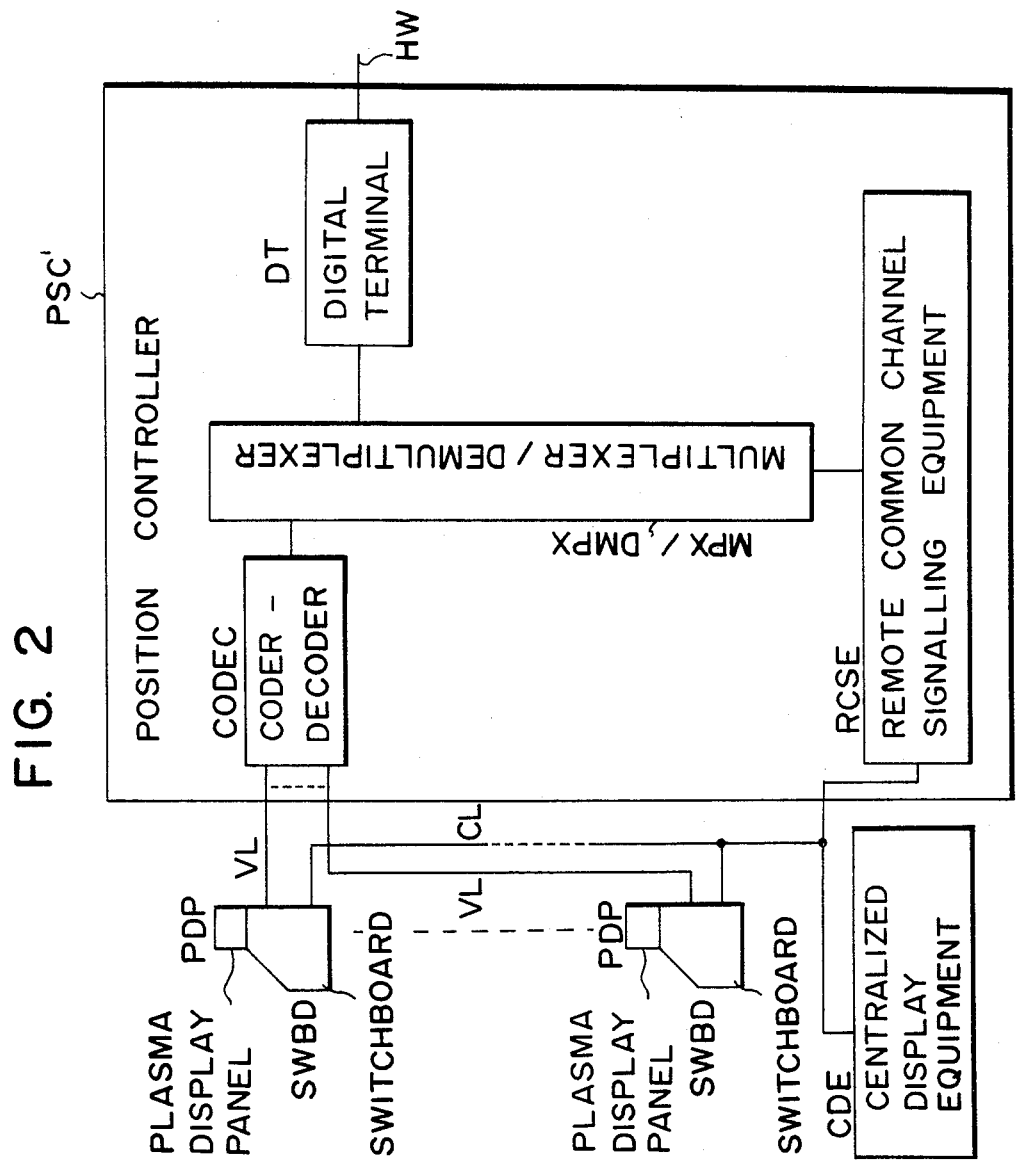
FIGS. 2 and 2A are connection diagrams illustrating the general arrangement of an embodiment of the present invention.
Figure 2A:
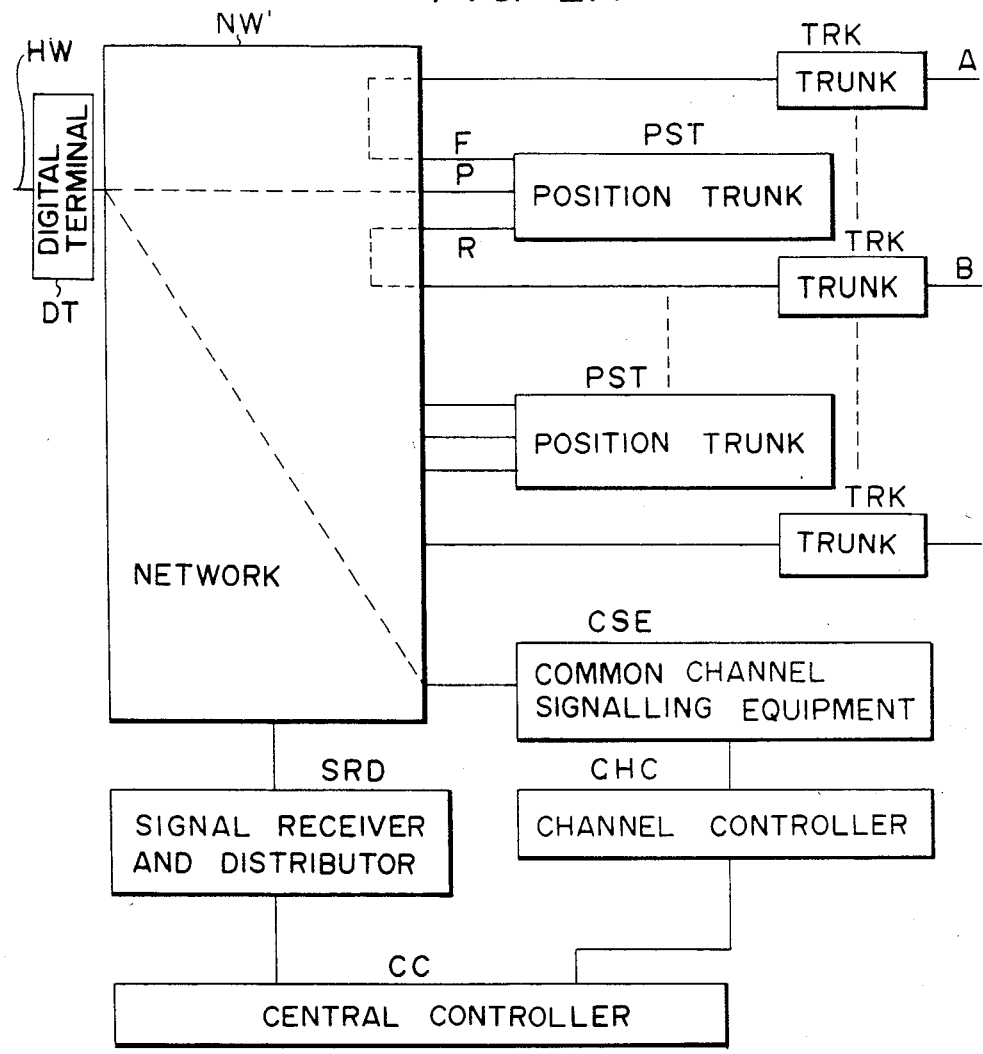
Figure 3:
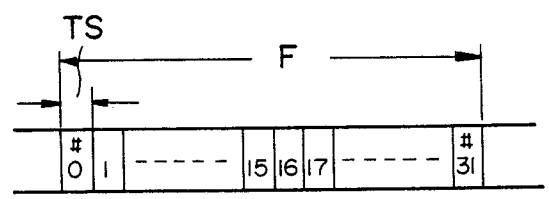
FIG. 3 shows, by way of example, the frame structure of a pulse coded modulation (PCM) transmission line in the embodiment of FIG. 2.

FIGS. 2 and 2A illustrate the general arrangement of a specific example of the present invention, and FIG. 3 shows, by way of example, the frame structure of a PCM transmission line employed in FIGS. 2 and 2A. In the illustrated example, a network NW', which accomodates the pluralities of trunks TRK and position trunks PST, is of the time division type. The plural, for instance 30, switchboards SWBD are connected to in the time division network NW' via a common position controller PSC', a common PCM highway line HW and a digital terminal DT. A frame F that is repeated with the period of the PCM highway HW, for example 8 KHz, includes, for instance, 32 time slots TS as shown in FIG. 3. Each time slot TS transmits an eight-bit PCM code. In FIG. 3, a time slot TS#0 is used for transmitting maintenance information on the switchboard SWBD, time slots TS#1 to TS#15 and TS#17 to TS#31 are respectively used for transmitting voice signals transmitted and received by the 30 switchboards SWBD, and a time slot TS#16 is used for transmitting controlling signals which convey a variety of information transmitted and received by the 30 switchboards SWBD, such as operation information for various keys, display information for various display units, including the display PDP and other information for exchange processing. The voice signal sent out from the switchboard SWBD is passed via the voice signal line VL to a coder-decoder CODEC of the position controller PSC', wherein it is rendered into an eight-bit PCM code, which is time-division multiplexed by a multiplexer/-demultiplexer MPX/DMPX. The time-division multiplexed signal is sent out via the digital terminal unit DT into one of the time slots TS#1 to #15 and #17 to #31 of the PCM highway HW. On the other hand, a PCM coded voice signal which is provided from each of the time slots TS#1 to #15 and #17 to #31 of the PCM transmission line HW to the position controller PSC' is applied to the multiplexer/demultiplexer MPX/DMPX and subjectd to the abovesaid processes in the reverse order, thereafter being fed to one of the switchboards SWBD via the voice signal line VL. Accordingly, one position controller PSC' permits communication of voice signals of the 30 switchboards SWBD. The aforesaid control signal transmitted and received by each switchboard SWBD is provided via the common control signal line CL to a remote common channel signalling equipment of unit RCSE of the position controller PSC', wherein it is coded into a predetermined form (for example, CCITT signalling system No. 7) or decoded. The coded or decoded signal is provided via the multiplexer/demultiplexer MPX/DMPX and the digital terminal DT connected to the PCM highway HW and is transmitted in its time slot TS#16. The time slot TS#16 of the PCM highway HW which is connected to the time division network NW' via the digital terminal DT is semi-fixedly connected with common channel signalling equipment or unit CSE via the time division network NW', and the aforementioned control signal is transmitted in the aforesaid coded form to the common channel signalling equipment CSE. With such an arrangement described above, the control signal indicating information from the key operation of each switchboard SWBD is transmitted to the central controller CC via a common channel signal link comprising by the remote common channel signalling equipment RCSE of the position controller PSC', the time slot TS#16 of the PCM highway HW and the common channel signalling equipment CSE. The control signal indicating display information for various display units of each switchboard SWBD, such as the plasma display panel PDP and lamps, which is sent out by the central controller CC, is transmitted via the abovesaid common channel signal link to the switchboard SWBD. On the other hand, the time slots TS#1 to #15 and #17 to #31 of the PCM highway HW are each connected to the terminal P of a predetermined position trunk PST via the time division network NW' on the basis of a designation by the central controller CC, enabling communication between the operator of the switchboard SWBD and a subscriber. The processing steps for the connection of a call which requests a connection by the switchboard SWBD are the same as described previously with respect to FIG. 1. In this case, control signals that are delivered and received between the central controller CC and the switchboard SWBD and voice signals that are exchanged between the operator of the switchboard SWBD and the calling and the called party, are all transmitted via the PCM highway HW which is a common transmission line.

As will be appreciated from the above, according to this embodiment, the 30 switchboards SWBD are connected to the time division exchange via the PCM highway which comprises one common transmission line. The control signals that are transferred between each switchboard and the central controller CC and the voice signals that are exchanged between the switchboard operator and the calling and the called subscriber, are all transmitted via the PCM highway HW.

Accordingly, any additional voice signal lines and trunks need not be provided between the respective switchboard SWBD and the network NW', and the only transmission line for the control signals between each switchboard SWBD and the central controller CC is the PCM highway HW. Therefore, no limitations are imposed on the distance between each switchboard and the time division exchange and the cost of the transmission line for the speech signal and the control signal is markedly reduced as a whole by using the common transmission line. In FIG. 2, reference character CDE indicates centralized display equipment, on which information of the status concerning exchange service and the system circuit status which is sent out as a display signal from the time division exchange can be displayed for all switchboard operators.

Figure 4:
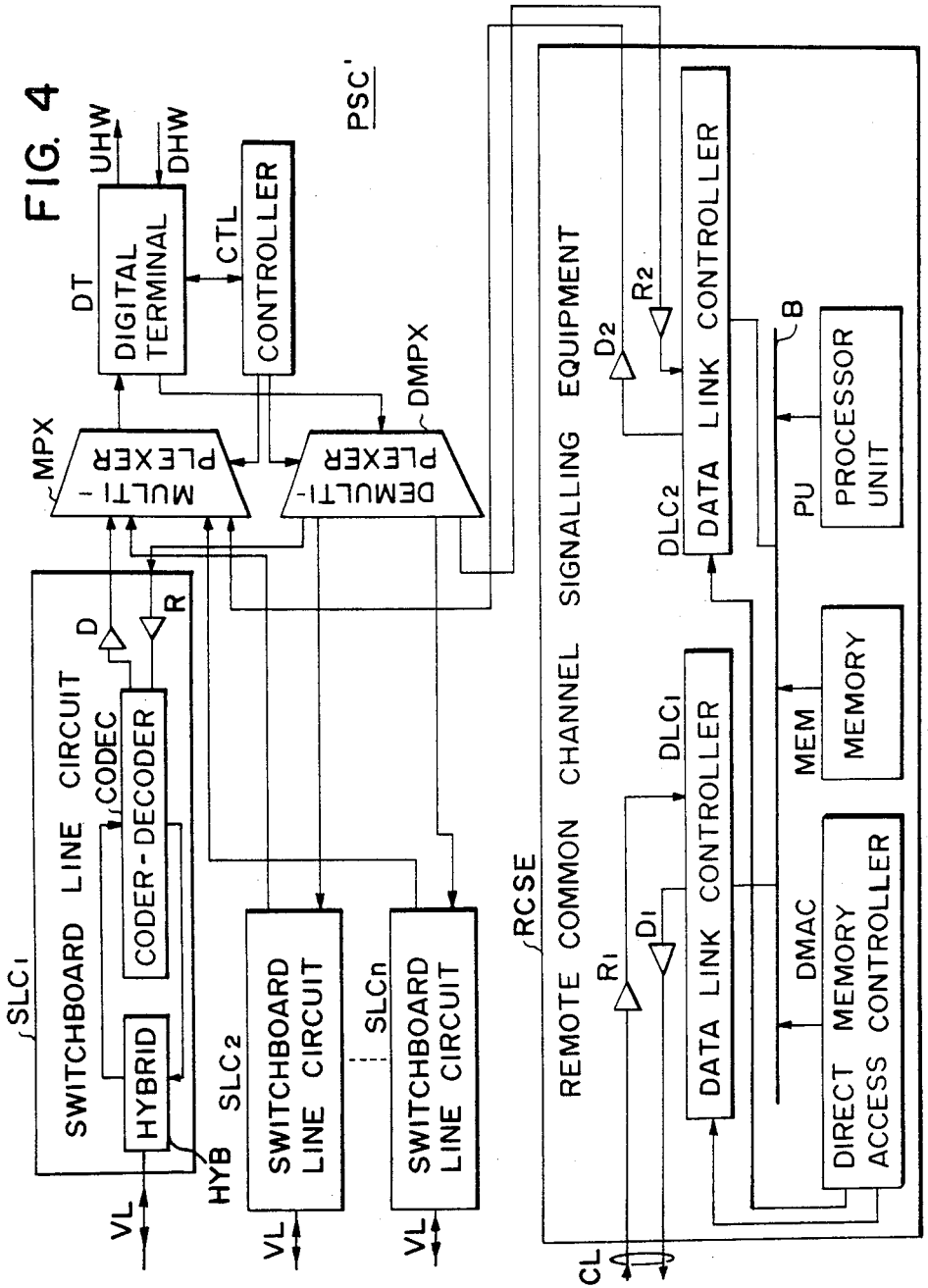
FIG. 4 is a connection diagram illustrating in detail the arrangement of a position controller PSC' in the embodiment of FIG. 2.

FIG. 4 illustrates in detail the arrangement of the position controller PSC' of FIG. 2. In FIG. 4, reference characters $SLC_1$, $SLC_2$, ..., $SLC_n$ indicate switchboard line circuits, each connected via a voice signal line VL to one switchboard (SWBD), and RCSE designates remote common channel signalling equipment, which is connected via a control signal line CL to each switchboard and, as required, the abovesaid centralized display equipment CDE.

Since the switchboard line circuits $SCL_1$ to $SCL_n$ are identical in construction, a detailed description will be given of the switchboard line circuit $SCL_1$ alone. A speech signal transmitted from the switchboard via the voice signal line VL is branched by a hybrid HB in the direction of transmission and encoded by the coder-decoder CODEC into a PCM code, which is applied via a line driver D to a multiplexer MPX.

In the remote common channel signalling equipment RCSE, a control signal digital in form sent via the control signal line CL from each switchboard is received by a line receiver $R_1$ and sent via a data link controller $DLC_1$ and a common bus B to a processor unit PU, wherein it is subjected to the necessary processing. Then the control signal is provided to the multiplexer MPX via a data link controller $DCL_2$ and a line driver $D_2$.

To the control signal line CL are connected the respective switchboards in a parallel relationship and, in this case, a known common bus system is employed to prevent interference of the control signals from the switchboards. Since the remote common channel signalling equipment RCSE can be installed in proximity to the switchboards, no limitations are imposed on the distance between each switchboard and the time division exchange even if the control signal line CL comprises the common bus system.

In the remote common channel signalling equipment RCSE, a memory MEM operates in association with the processor unit PY.U, and the data link controllers $DLC_1$ and $DLC_2$ are permitted direct access to the memory MEM through a direct memory access controller DMAC.

The speech signal transmitted from each switchboard to one of the subscriber circuits $SLC_1$ to $SLC_n$ and the control signal transmitted from each switchboard to the remote common channel signalling equipment RCSE are time-division multiplexed by the multiplexer MPX and provided via the digital terminal DT to an upward highway, over which they are sent to the time division exchange.

From the time division exchange are transmitted a speech signal and a control signal over a downward highway DHW for each switchboard. These signals are provided via the digital terminal DT to a demultiplexer DMPX, wherein they are separated.

The speech signals for the respective switchboards are separated by the demultiplexer DMPX for each of the switchboard line circuits $SLC_1$ to $SLC_n$, i.e. distributed thereto. In the case of the switchboard line circuit $SLC_1$, the speech signal separated by the demultiplexer DMPX is received by a line receiver R in the switchboard line circuit $SLC_1$ and applied to the coder-decoder CODEC, wherein it is decoded into an analog voice signal, which is transmitted from the hybrid HYB to the switchboard via the voice signal line VL.

The control signals for the respective switchboards are separated by the demultiplexer DMPX into individual control signals. Each control signal is applied to the remote common channel signalling equipment, wherein it is received by a line receiver $R_2$. The received signal is supplied to the data link controller $DLC_2$ and then provided via the bus B to the processor unit PU, which performs predetermined processing of the signal in cooperation with the memory MEM. Thereafter, the control signal is provided on the control signal line CL via the data link controller $DLC_1$ and a line driver $D_1$.

To the control signal line CL are connected the switchboards. The control signal can be transferred to a predetermined switchboard through the known common bus system.

In the above described system, the time slots TS#16 of the signal frames F of the upward and downward highways UHW and DHW can be assigned to the signal provided from the remote common channel signalling equipment RCSE to the multiplexer MPX and the signal from the demultiplexer DMPX to the remote common channel signalling equipment RCSE, as described previously with respect to FIG. 3.

Reference character CTL identifies a controller for the multiplexer MPX and the demultiplexer DMPX, which is supplied with synchronizing pulses from the digital terminal DT to control the timing of the multiplexing and separation.

Figure 5:
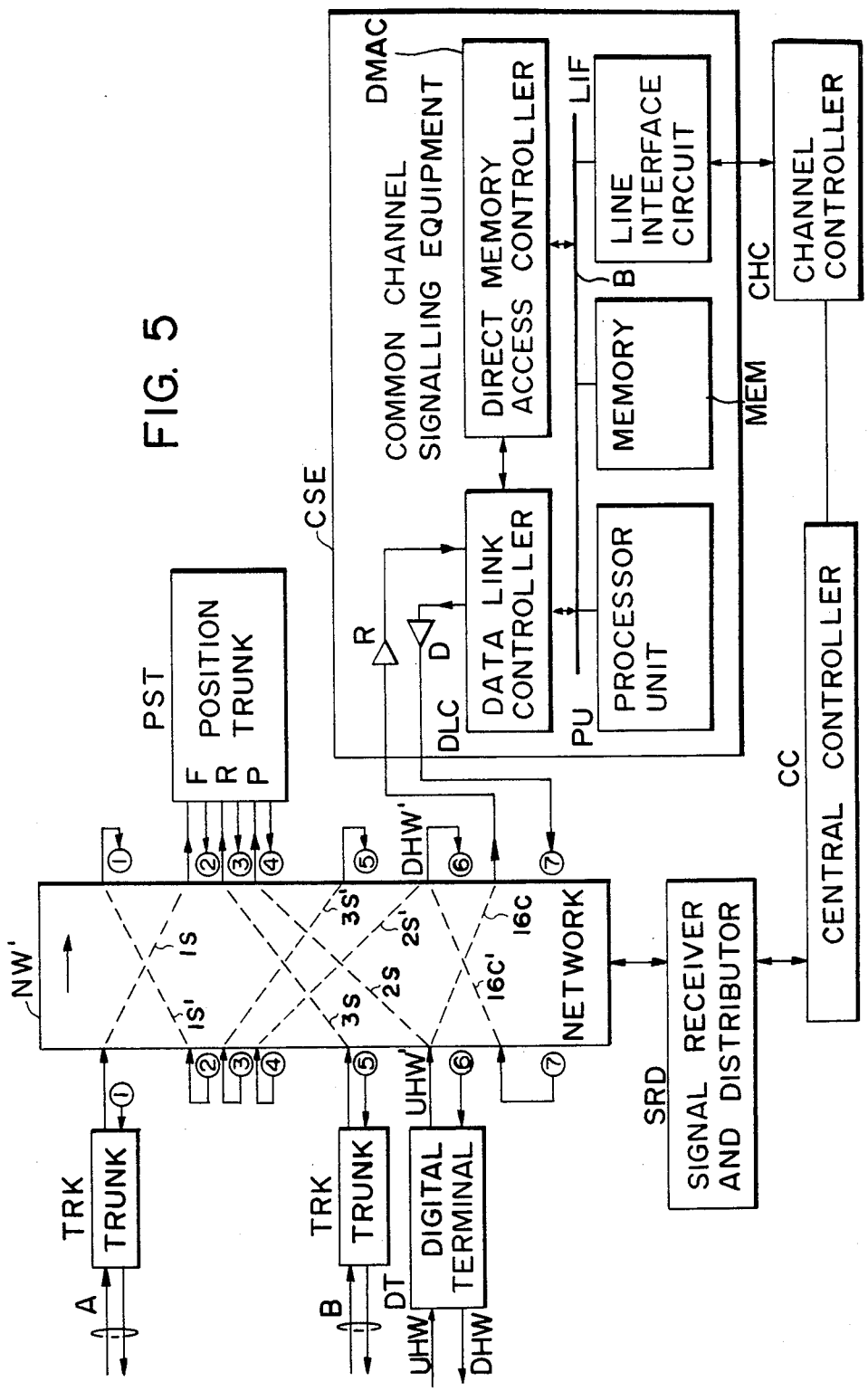
FIG. 5 is a connection diagram illustrating in detail the arrangement of a time division switch in the embodiment of FIG. 2.

FIG. 5 illustrates in detail the arrangement of the time division exchange used in the specific example shown in FIG. 2A. In FIG. 5, the parts corresponding to those in FIG. 2A are identified by the same reference characters. In the common channel signalling equipment CSE, reference character D indicates a line driver; R designates a line receiver; DLC identifies a data link controller; DMAC denotes a direct memory access controller; B represents a common bus; PU shows a processor unit; MEM shows a memory; and LIF signifies a line interface circuit.

Let it be assumed that the network NW' transfers a signal in the direction of an arrow located in the upper portion of the network NW' block, and that the ends of lines indicated by corresponding numerals are interconnected directly (without passing through the network NW'). For instance, the ends of lines marked with ① and ① are interconnected directly.

An input line from a trunk or like unit to the network NW' and an output line therefrom to the unit are shown at the same level on the left and right sides of the network NW', respectively.

As will easily be seen from FIG. 5, the network NW' is connected via the upward and downward highways UHW and DHW to the position controller PSC' in FIG. 4, and the time slots TS#16 of the upward and downward highways UHW and DHW for the control signal are semi-fixedly connected to the common channel signalling equipment CSE through the network NW' as indicated by the broken lines 16C and 16C'.

When deciding that an incoming call from the trunk line A is requesting a connection by the switchboard SWBD, the central controller CC of the time division exchange sends an incoming indicator signal to one of the plurality of switchboards SWBD which is selected following a predetermined procedure. This signal is provided from the central controller CC via the channel controller CHC to the line interface circuit LIF of the common channel signalling equipment CSE, and it is subjected to predetermined processing in the processor unit PU which cooperates with the memory MEM, thereafter being applied via the common bus B and the data link controller DLC to the line driver D to be sent out therefrom. This control signal is outputted at the timing of the time slot TS#16 of the downward highway DHW and it is sent from a line end ⑦ via the route 16C' of the network NW' to a line end ⑥, from which it is sent out via the digital terminal DT and over the time slot TS#16 of the signal frame F of the downward highway DHW to the position controller PSC'. The control signal is further transferred to the switchboard SWBD selected as referred to previously. When the operator of the selected switchboard SWBD answers by operating the answer key, the central controller CC detects the operation of the answer key through the control signal line CL, the position controller PSC' and the upward highway UHW on the side of the switchboard and the digital terminal DT, the upward highway UHW', the network NW', the line 16C and the common channel signalling equipment CSE on the side of the time division exchange. The central controller CC seizes an idle position trunk PST and controls the network NW', by which the terminal F of the position trunk PST is connected via routes 1S and 1S' to the trunk TRK connected to the trunk line A and a speech channel corresponding to the time slot for conveying speech signals transferred to and from the switchboard is extended to the terminal P of the position trunk PST via routes 2S and 2S'. The operator of the switchboard SWBD inquires of the calling party about the classification of the call, the calling party's number and the called party's number, and operates an input key to enter information necessary for preparing a toll ticket. The central controller CC detects information concerning the operation of the input key via the same route as that of the aforementioned signal for the operation information for the answer key and sends the toll ticket information to the plasma display panel PDP on the switchboard SWBD via the same route as that of the aforesaid incoming indicator signal. Thus the toll ticket information is displayed and, at the same time, it is stored in a memory (not shown). Upon actuation of the called subscriber select key by the operator of the switchboard SWBD, the central controller CC detects the operation of the called subscriber select key in the same manner as described previously. Then the central controller CC seizes a trunk TRK connected to an idle trunk line B leading to the called subscriber, controls the network NW' to connect the trunk TRK to the terminal R of the position trunk PST via routes 3S and 3S', and performs the processing for the connection of the called party. Upon detection of an answer from the called party via the trunk TRK, the central controller CC sends out a control signals as described previously to control a predetermined lamp on the switchboard SWBD, informing the operator of the answer. When the switchboard operator operates a disconnect key after confirming communication between the calling and the called subscriber, the central controller CC similarly detects the operation of the disconnect key and controls the network NW' to disconnect the terminal P of the position trunk PST from the voice channel of the switchboard SWBD.

In FIG. 5, the trunk TRK, the position trunk PST, the common channel signalling equipment CSE and the network NW' are interconnected by non-multiplexed lines, but the digital terminal DT and the network NW' are connected by a multiplexed line (the upward and downward highways UHW' and DHW').

Figure 6:
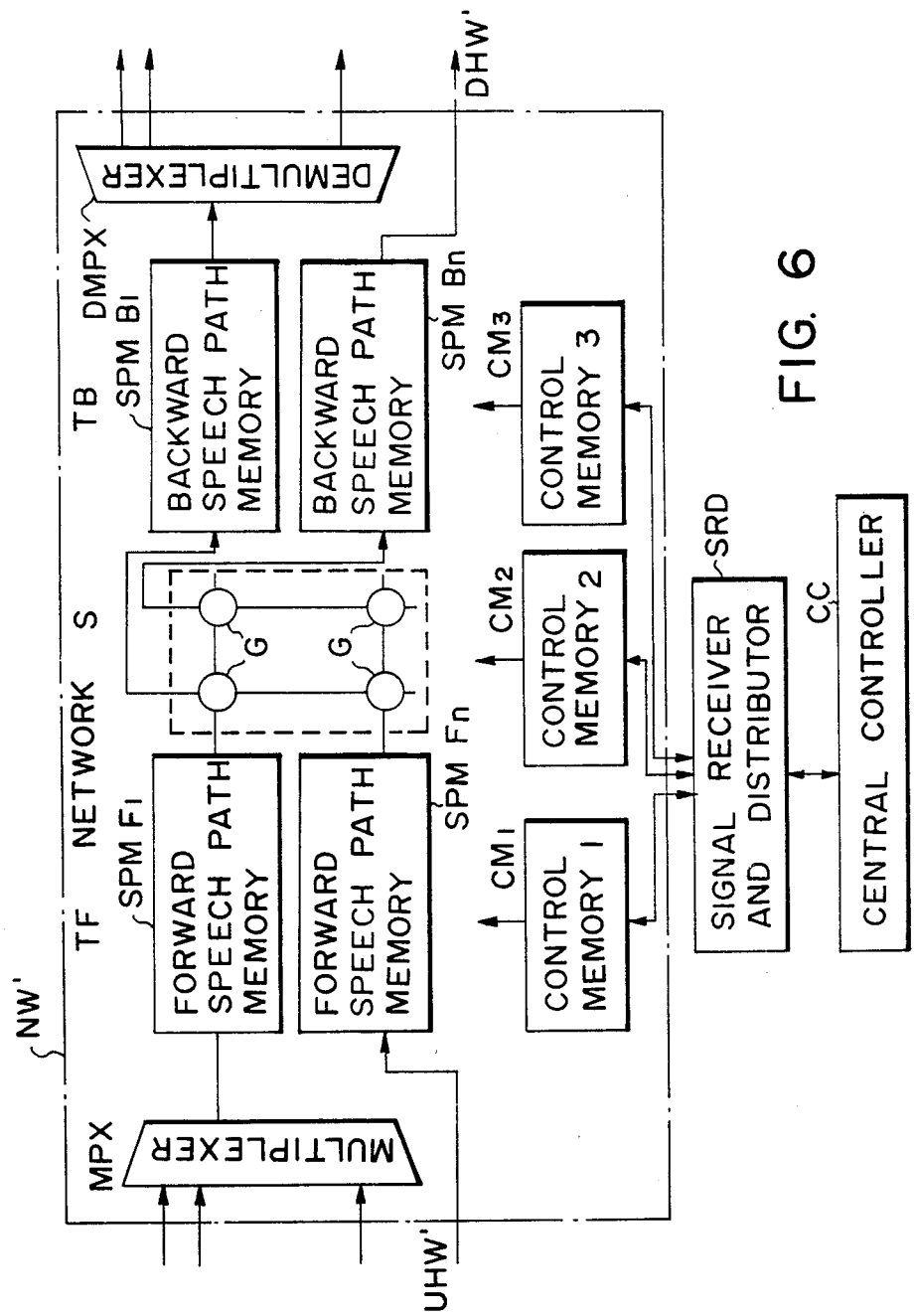
FIG. 6 is a connection diagram illustrating in detail an example of a network applicable to the embodiment of FIG. 2A.

FIG. 6 illustrates in detail the arrangement of an example of the time division network NW' which is applicable to the time division exchange used in FIGS. 2A and 5.

In FIG. 6, reference character MPX indicates a multiplexer; TF designates a forward time switching stage; S identifies a space switch; TB denotes a backward switching stage; and DMOX represents a demultiplexer. The network NW' is of a known TXSXT (time-space-time) three-stage construction. Reference characters SPM $F_1$ to SPM $F_n$ indicate forward speech path memories set up in the forward time switching stage TF; and SPM $B_1$ to SPM $B_n$ designate backward speech path memories provided in the backward time switching stage. The forward speech path memories SPM $F_1$ to SPM $F_n$ are controlled by a control memory $CM_1$; the backward speech path memories SPM $B_1$ to SPM $B_n$ are controlled by a control memory $CM_3$; and a gate G of the space switch S is controlled by a control memory $CM_2$. The forward speech path memories SPM $F_1$ to SPM $F_n$ input multiplexed signals and the backward speech path memories SPM $B_1$ to SPM $B_n$ output multiplexed signals.

Accordingly, the output ends of equipment which handle non-multiplexed signals, such as the trunk TRK, the position trunk PST and the common channel signalling equipment CSE in FIG. 5, are connected to the input ends of the multiplexer MPX, and the input ends of the abovesaid equipment are connected to the output ends of the demultiplexer DMPX. The lines over which multiplexed signals are transmitted, such as the upward and downward highways UHW' and DHW' can be connected, for instance, to the forward speech path memory SPM $F_n$ and the backward speech path memory $SPMB_n$.

In FIG. 6, reference character SRD indicates a signal receiver and distributor, and CC designates a central controller.

Numerous changes may be made in the above described embodiments, and different embodiments of the invention may be made without departing from the spirit thereof; therefore, it is intended that all matter contained in the foregoing specification and the accompanying drawings shall be interpreted as illustrative and not in a limiting sense.

For instance, the number of time slots TS forming the frame F of the PCM highway HW and the arrangement of the time slots according to use are not limited specifically to those shown in FIG. 3 and various other modifications are possible but, in any case, the advantages of the present invention described in the foregoing could be equally obtained. Needless to say, the coded form of the control signal that is transmitted over the common channel signal link including the common channel signalling equipment CSE and the remote common channel signalling equipment RCSE is not limited specifically to the CCITT signalling system No. 7 mentioned previously. Further, the information that is transmitted over the abovesaid common channel signal link is not limited to the control signals of the 30 switchboards. It is also possible that control signals unaccompanied by voice signals, for instance, control signals which do not correpond to individual exchanges, such as control signals representing display information for the centralized display equipment CDE, which indicates the status of exchange service or circuit status, are transmitted together with the abovesaid control signals within the tolerance of the information transmission ability of the common channel signal link (for example 64 K bits/minute in FIG. 3). Also in such a case, the same effects as described previously could be obtained. Incidentally, the PCM transmission line shown in FIG. 3 is not restricted spoecifically to the PCM-30 system and may also be of PCM-24 system, for example.

Moreover, in the present invention, the remote common channel signalling equipment and the common channel signalling equipment can easily be duplexed, by which the control signal line can be protected from trouble.

In addition, the load on the processor can easily be decentralized by disposing the remote common channel signalling equipment on the side of the switchboard and the common channel signalling equipment on the side of the time division exchange, that is, by dividing the processor unit into two processors.

What is claimed is:

1. A switchboard control system for a time division exchange having a plurality of switchboards and common channel signalling equipment connected to a time division network, and for transfering speech and control signals, comprising:
    a time division multiplex transmission line operatively connected to the time division network and common to the speech signals and control signals being transferred between the switchboards and the time division network of the time division exchange, for transmitting the speech and control signals on a time-division-multiplexed basis; and
    a position controller, operatively connected to said time division multiplex transmission line and the switchboards, for multiplexing the speech and control signals from the switchboards and inputting them onto said time division multiplex transmission line for transmission to the time division network of the time division exchange, and for demultiplexing time-division-multiplexed speech and control signals sent via said time division multiplex transmission line from the time division network of the time division exchange and inputting the demultiplexed signals into the switchboards, said position controller including:

remote common channel signalling equipment operatively connected to the time division multiplex transmission line;

a speech signal line operatively connected to the switchboards; and a control signal line operatively connected between the switchboards and said remote common channel signalling equipment, the control signal being transmitted via a route including said time division multiplex transmission line between the common channel signalling equipment provided in said time division exchange and said remote common channel signalling equipment provided in the position controller and being transmitted via said control signal line provided separately from said speech signal line between said remote common channel signalling equipment and each switchboard.

2. A switchboard control system according to claim 1, wherein said control signal line is a common bus.

3. A switchboard control system according to claim 1, wherein said remote common channel signalling equipment and the common channel signalling equipment are semifixedly interconnected via said time division multiplex transmission line and the time division network.

4. A switchboard control system, for a time division exchange, allowing connection of at least two subscriber trunks by a switchboard operator, comprising:

a switchboard producing voice and control signals;

a position controller operatively connected to said switchboard;

a time division multiplex line, operatively connected to said position controller for transmitting the voice and control signals;

a time division network operatively connected to said time division multiplex line and to the at least two subscriber trunks; and a position trunk operatively connected to said time division network.

5. a switchboard control system for a time division exchange, allowing connection of at least two subscriber trunks by a switchboard operator, comprising:

a switchboard;

a position controller operatively connected to said switchboard, said position controller comprising:

a codec operatively connected to said switchboard;

a remote common channel signalling unit operatively connected to said switchboard; and a multiplexer/demultiplexer operatively connected to said codec and said remote common channelling signalling unit;

a time division network operatively connected to said position controller, to the at least two subscriber trunks and said multiplexer/demultiplexer; and a position trunk operatively connected to said time division network.

6. A switchboard control system according to claim 5, wherein said remote common channel signalling unit comprises:

a first data link controller operatively connected to said switchboard;

a common bus operatively connected to said first data link controller;

a direct memory access controller operatively connected to said common bus and said first data link controller;

a processor unit operatively connected to said common bus;

a memory operatively connected to said common bus; and a second data link controller operatively connected to said common bus and said multiplexer/demultiplexer.

* * * * *

UNITED STATES PATENT AND TRADEMARK OFFICE
CERTIFICATE OF CORRECTION

PATENT NO. : 4,580,259         Page 1 of 2

DATED : April 1, 1986

INVENTOR(S) : HIDEMI HARADA ET AL.

It is certified that error appears in the above-identified patent and that said Letters Patent is hereby corrected as shown below:

On the title page:

[56] References Cited, OTHER PUBLICATIONS, line 8, "Tlecom" should be --Telcom--;

line 6, (second column, front page) "Commultation" should be --commutation--;

[57] ABSTRACT, line 6, delete "the";

line 17, after "remote" insert --common--.

Col. 1, line 19, (line numbering off), "NXR-20" should be --NXE-20--;

line 25, delete "in";

line 41, after "that" insert --answered--.

Col. 2, line 6, "Secondly" should be --Second--;

line 21, "lin" should be --line--.

Col. 3, line 46, delete "in".

Col. 4, line 63, "accomo-" should be --accommo--;

line 66, delete "in".

Col. 5, line 29, "subjectd" should be --subjected--;

line 37, "of" (first occurrence) should be --or--.

UNITED STATES PATENT AND TRADEMARK OFFICE
CERTIFICATE OF CORRECTION

PATENT NO. : 4,580,259         Page 2 of 2

DATED : April 1, 1986

INVENTOR(S) : HIDEMI HARADA ET AL.

It is certified that error appears in the above-identified patent and that said Letters Patent is hereby corrected as shown below:

Col. 7, line 7, "PY.U" should be --PU--;

line 49, "above described" should be --above-described--.

Col. 9, line 42, "DMOX" should be --DMPX--.

Col. 10, line 40, "spoecifically" should be --specifically--.

Signed and Sealed this

Nineteenth Day of August 1986

[SEAL]

Attest:

DONALD J. QUIGG

Attesting Officer      Commissioner of Patents and Trademarks

UNITED STATES PATENT AND TRADEMARK OFFICE
CERTIFICATE OF CORRECTION

PATENT NO. : 4,580,259

DATED : April 1, 1986

INVENTOR(S) : Hidemi Harada et al.

It is certified that error appears in the above-identified patent and that said Letters Patent is hereby corrected as shown below:

On the title Insert

-- (30) Foreign Application Priority Data

March 20, 1981 (JP) Japan            41353/1981--.

Signed and Sealed this

Sixteenth Day of September 1986

[SEAL]

Attest:

DONALD J. QUIGG

Attesting Officer         Commissioner of Patents and Trademarks